Sept. 1, 1964 C. E. M. TIBBS ETAL 3,147,360

HIGH FREQUENCY HEATING EQUIPMENT

Filed May 8, 1961 2 Sheets-Sheet 1

Inventors
Christopher E. M. Tibbs
David J. Spash
By
Kemon, Palmer, Stewart & Estabrook
Attorneys Sept. 1, 1964 C. E. M. TIBBS ETAL 3,147,360

HIGH FREQUENCY HEATING EQUIPMENT

Filed May 8, 1961 2 Sheets-Sheet 2

Inventors
Christopher E. M. Tibbs
David J. Spash
By Kemon, Palmer, Stewart & Estabrook
Attorneys United States Patent Office 3,147,360
Patented Sept. 1, 1964

3,147,360
HIGH FREQUENCY HEATING EQUIPMENT

Christopher Evan Mundell Tibbs and David Isaac Spash, both of Wokingham, England, assignors to Radio Heaters Limited, Wokingham, England, a British company Filed May 8, 1961, Ser. No. 108,491
Claims priority, application, Great Britain, May 13, 1960, 17,037/60
6 Claims. (Cl. 219—10.55)

Figure 1:
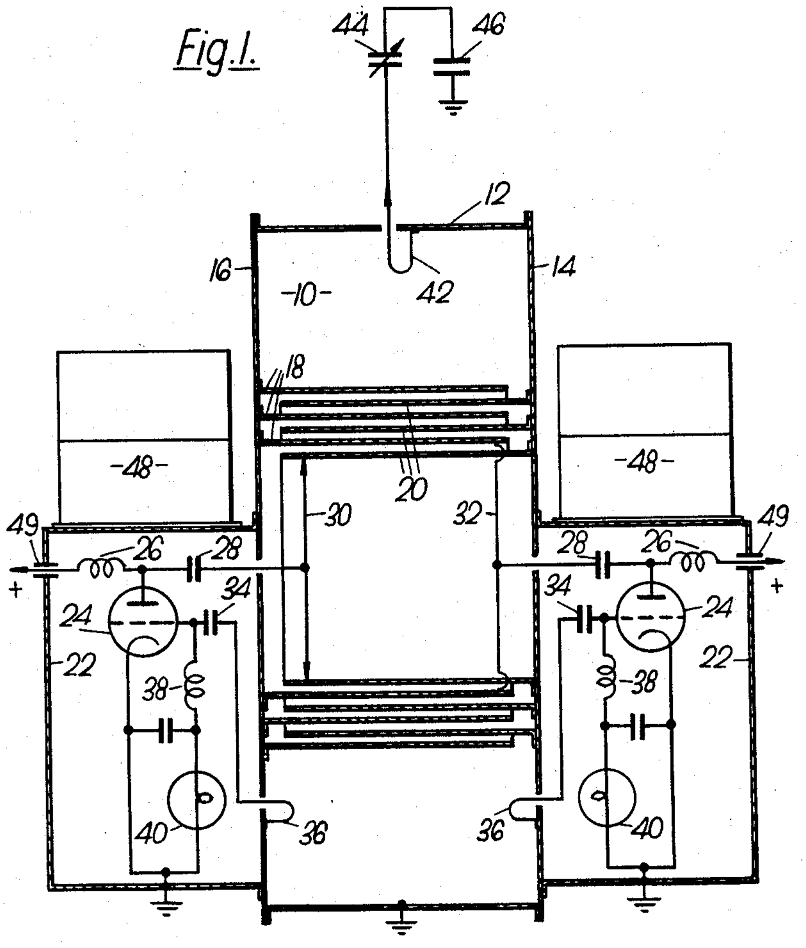

This invention relates to the reduction of interference radiation from high frequency heaters, and in particular to the reduction of such radiation from heaters in which the work electrode or the work circuit cannot be fully screened.

According to the present invention the generator of a radio frequency heater comprises an oscillator having oscillator valves arranged to operate in push-pull relationship, and having a cavity resonator tank circuit providing an output for an incompletely screened work circuit. We have found that the intensity of harmonic interference radiated by equipment of this kind is substantially reduced, as compared with that radiated by a generator of conventional design, without substantially impairing the efficiency of the generator.

It would probably have been expected that the use of push-pull valves in an oscillator would reduce the radiation of even harmonics, and therefore the use of a push-pull oscillator would seem to have been obviously desirable. However, push-pull oscillators have not been used on any appreciable scale owing to practical difficulties which resulted in very short valve life. One of these difficulties was that in radio frequency heating apparatus the load normally varies over a very wide range and that such variation tends to upset the balance between the two oscillator valves, with the result that one valve will draw a much greater current than the other. The overloaded valve can easily be destroyed in this manner. Variations in the load can also affect the efficiency of an oscillator valve without greatly affecting the current drawn, again with the result that overheating would take place. In addition to this practical difficulty, it has been generally accepted that if the oscillator valves are operated in push-pull the efficiency of an industrial heater oscillator circuit is worse than in the case with a single valve. Furthermore, although a reduction in even harmonics might have been expected, it was not obvious that odd harmonics also would be reduced in amplitude, and therefore it was generally expected that interference attenuation measures to deal with these odd harmonics would still be necessary in a push-pull generator. These factors, together with the added complexity and cost of individual metering for valve anode and grid currents appear to have prevented widespread use of push-pull oscillators in radio frequency heaters.

We have found that the use of a cavity tank circuit has a stabilising effect on the operation of a push-pull oscillator, and substantially removes the difficulty of maintaining balance between the valves. In a generator according to the present invention, each valve appears to be substantially immune to changes in the characteristics of the other valve, and a balance achieved during the initial setting up of the equipment is not substantially affected even if a valve is replaced in the field. This greatly reduces the danger of one of the valves burning out due to overloading.

Figure 2:
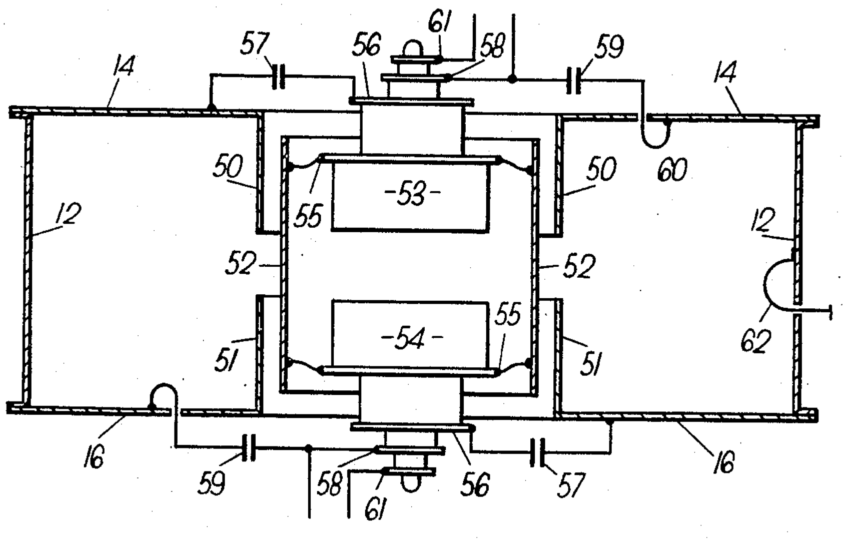

In order that the invention may be better understood an embodiment thereof will now be described with reference to the accompanying drawings, in which:

FIGURE 1 shows diagrammatically a generator and output circuit for radio frequency plastic welding equipment; and FIGURE 2 shows an alternative form of generator embodying the invention.

FIGURE 1 shows a generator for plastic welding equipment having an output power of about 6 kilowatts, and in which it was not possible to screen the work electrodes completely. The tank circuit of the generator is shown as a cylindrical cavity resonator 10 comprising an outer cylindrical wall 12, and two end plates 14 and 16. The ratio of the diameter of the cavity to its length is about 2.5:1. The cavity comprises an inner conductor unit forming a concentrated capacitance in the form of a number of concentric cylinders, alternate ones of which are connected to opposite end plates of the cavity. Thus, the plates 18 are connected to the end plate 16 and the plates 20 are connected to the end plate 14. To each end plate there is affixed a screened compartment 22 housing one of the push-pull oscillator valves 24. The anode of each valve is connected through a radio frequency choke 26 and a filter capacitor 49 to a source of positive voltage and through a blocking capacitor 28 to tappings 30 and 32 on the inner cylinders within the cavity. One of the push-pull valves 24 is in this way connected to the innermost of the concentric cylinders which is one of the cylinders 20 which form one electrode of the concentrated capacitance, and the other push-pull valve is connected to the next of the concentric cylinders, which is one of the cylinders 18 forming the other electrode of the concentrated capacitance. By adjusting the positions of the tappings 30 and 32, a balance can be achived in the currents drawn by the two valves.

The grids of the two valves 24 are connected through capacitors 34 to grid pick-up loops 36 extending into the cavity, and also through radio frequency chokes 38 to tungsten filament lamps 40, the effect of which is to increase the resistance in the grid circuit when the grid current increases.

A small output pick-up loop 42 is connected through a series variable capacitor 44 to one of the work electrodes 46, the other of which is connected to the frame of the equipment. Fan units 48 are provided to prevent overheating of the equipment.

If desired, overload trips can be arranged in the anode supply circuits of the valves, in order to provide a safeguard in case one of the valves fails. However, we have found that when a valve fails, the second valve usually continues to operate without substantial reduction of efficiency.

If desired, the lamps 40 may be replaced by stabiliser means in order to render more uniform the angle of current conduction of the valves. However, we have found that in fact this angle is not very critical. We prefer to operate with an angle of current conduction of about 180° but angles between 160° and 200° have also been used satisfactorily. Even if the angle of current conduction is substantially below 160° a very considerable amount of suppression is obtained.

We have found it preferable to use loose coupling to couple the generator to the output circuit feeding the work circuit. The coefficient of inductive coupling between the generator and the output circuit should not exceed the critical inductive coupling by a factor of more than 20, and preferably not by a factor of more than 5.

Radio frequency filters should be inserted in all power supply leads to the oscillator valves.

If desired, the inner cylinder may be made of adjustable length, for example by forming it in two portions which can be adjusted axially with respect to one another to vary the effective length of the inner cylinder.

This enables adjustment of the inner cylinder to set the operating frequency of the cavity resonator in the factory.

In tests in which the equipment illustrated in FIGURE 1, operating in Class C manner, was compared with equipment having the same output powder but using a cavity resonator with a single valve Class C oscillator, the same load being used in each case, we found that second harmonic radiation was reduced from 78 db to 36 db, third harmonic radiation from 67 db to 57 db, fourth harmonic radiation from 41 db to 26 db, and fifth harmonic radiation from 38 db to 28 db. It will be seen from these figures that, although the even harmonics experience the greatest reduction, there is also a considerable amount of reduction in the radiation of odd harmonics.

Although the equipment described above was used in plastic welding apparatus, the invention can also be applied to other forms of dielectric heating equipment and also to some forms of induction heating equipment.

FIGURE 2 shows an alterantive form of apparatus embodying the present invention which uses a cavity tank circuit arranged to produce a voltage multiplying effect as more fully described in our co-pending application No. 247,400, now Patent No. 3,125,656. In the apparatus shown in FIGURE 2, the cavity includes a cylindrical outer casing 12 between centrally apertured end plates 14 and 16. A cylinder 50 co-axial with the casing 12 extends from the end plate 14 into the cavity, and a cylinder 51 extends from the end plate 16 into the cavity. However, there is a gap between the inner ends of the cylinders 50 and 51. A further cylinder 52 which extends almost from the top to bottom of the cavity lies within the cylinders 50 and 51 and forms with them two-series-connected capacitors. These two capacitors are constituted respectively by the cylinder 50 and the upper half of the cylinder 52 and by the cylinder 51 and the lower half of the cylinder 52.

Two triode oscillator valves 53 and 54 are mounted partly within the central aperture of the cavity, and project from opposite ends of the latter. The anode terminals 55 of the two oscillator valves are connected to the cylinder 52 which forms a common electrode for the two series-connected capacitors, and the grid terminals 56 of the two valves are connected through capacitors 57 to the two end plates 14 and 16 respectively. One filament terminal 58 of each valve is connected through a capacitor 59 to a pick-up loop 60 which provides the driving voltage for the grid-cathode circuit of the valve. The terminals 58, together with the other filament terminals 61 are also connected to the usual filament supply source, not shown. An output loop 62 is provided for coupling the cavity tank circuit to the work circuit of the equipment.

We claim:

1. Radio frequency heating equipment employing incompletely screened heating electrodes and comprising: an RF generator including a cavity resonator tank circuit and screened oscillator tubes connected in push-pull relationship, said cavity tank circuit controlling the frequency of oscillation and oscillating in the mode corresponding to its lowest frequency of oscillation; incompletely screened heating electrodes located outside said cavity resonator; means coupling energy within said resonator to said heating electrodes; and a capacitance unit within said cavity resonator defined by conductive members mounted within said cavity and extending substantially linearly therewithin.

2. Radio frequency heating equipment as defined by claim 1 in which said capacitance unit includes a number of inner coaxial hollow members of shape similar to the cavity casing, said hollow members extending from opposite ends of said cavity.

3. Radio frequency heating equipment according to claim 2 in which said capacitance unit includes coaxial cylinders extending from opposite ends of said cavity, said cylinders being connected to the anodes of said oscillator tubes.

4. Radio frequency heating equipment according to claim 1 including means for stablising the bias voltages applied to each tube.

5. Radio frequency heating equipment according to claim 4 including a gas stabiliser tube connected in the grid circuit of each of the oscillator tubes.

6. Radio frequency heating equipment according to claim 1, in which the angle of current conduction for each tube is between 160° and 200°.

References Cited in the file of this patent

UNITED STATES PATENTS

| | | |
|---|---|---|
| 2,169,305 | Tunick | Aug. 15, 1939 |
| 2,266,500 | Lindenblad | Dec. 16, 1941 |
| 2,944,133 | Tibbs | July 5, 1960 |
| 3,066,210 | Goetter et al. | Nov. 27, 1962 |
| 3,118,999 | Dreyer | Jan. 21, 1964 |

FOREIGN PATENTS

| | | |
|---|---|---|
| 916,464 | Great Britain | Jan. 23, 1963 |